May 1, 1962    J. TRABEN    3,032,084
DIVIDING WOOD, ESPECIALLY ROUND TIMBER LOGS
Filed Dec. 13, 1957    6 Sheets-Sheet 1

INVENTOR
Josef TRABEN
by Mead, Browne, Schuyler & Beveridge
ATTORNEYS

May 1, 1962 J. TRABEN 3,032,084
DIVIDING WOOD, ESPECIALLY ROUND TIMBER LOGS
Filed Dec. 13, 1957 6 Sheets-Sheet 2

INVENTOR
Josef TRABEN
by Mead, Browne, Schuyler & Beveridge
ATTORNEYS

May 1, 1962 J. TRABEN 3,032,084
DIVIDING WOOD, ESPECIALLY ROUND TIMBER LOGS
Filed Dec. 13, 1957 6 Sheets-Sheet 3
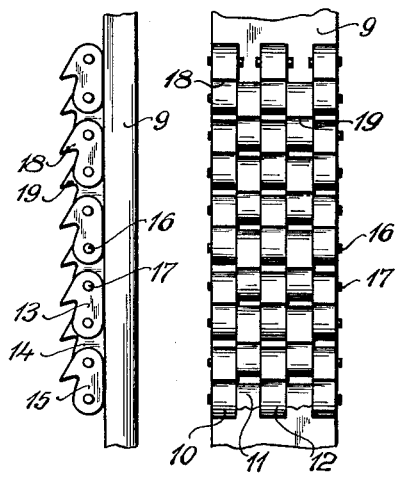
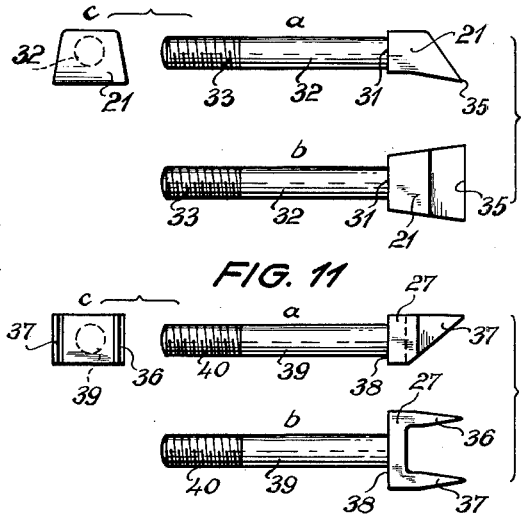
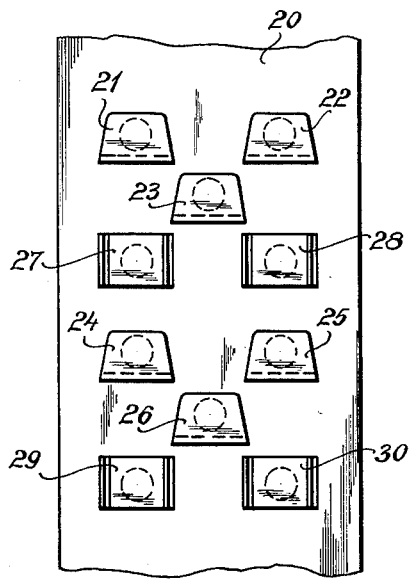
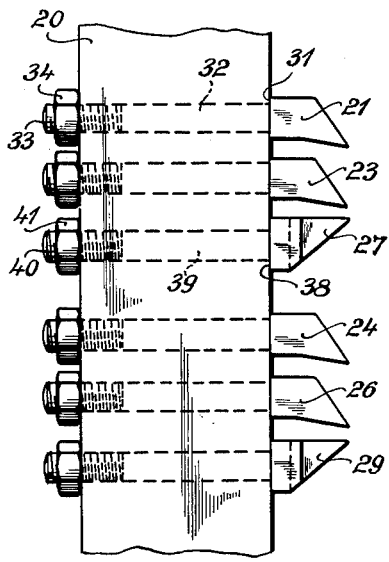
INVENTOR
Josef TRABEN
by Mead, Browne, Schuyler & Beveridge
ATTORNEYS May 1, 1962　　　　J. TRABEN　　　　3,032,084
DIVIDING WOOD, ESPECIALLY ROUND TIMBER LOGS
Filed Dec. 13, 1957　　　　　　　　　　　6 Sheets-Sheet 4

INVENTOR
Josef TRABEN
by Mead, Browne, Schuyler & Beveridge
ATTORNEYS

INVENTOR:
JOSEF TRABEN

May 1, 1962  J. TRABEN  3,032,084
DIVIDING WOOD, ESPECIALLY ROUND TIMBER LOGS
Filed Dec. 13, 1957  6 Sheets-Sheet 6
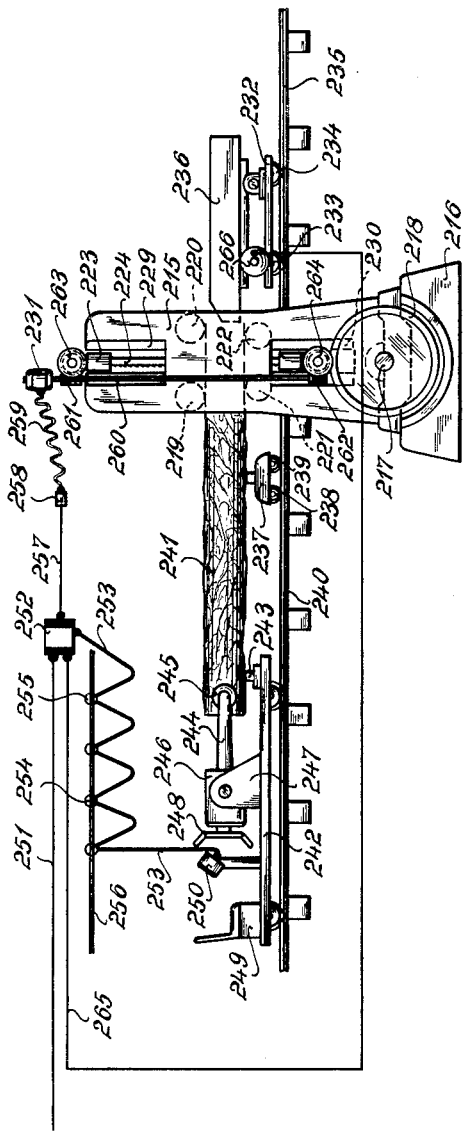
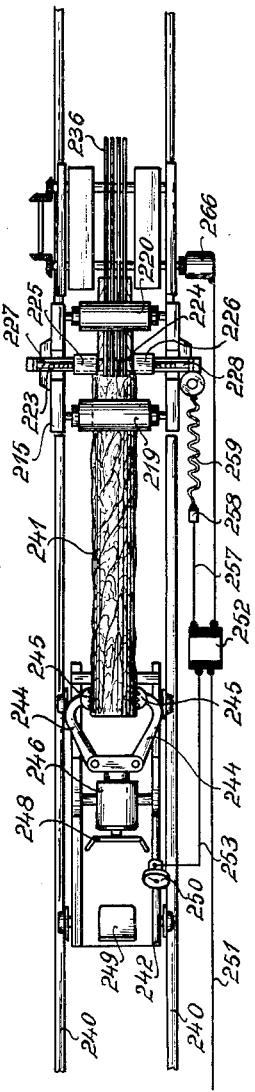
INVENTOR
Josef TRABEN

United States Patent Office 3,032,084
Patented May 1, 1962

3,032,084
DIVIDING WOOD, ESPECIALLY ROUND TIMBER LOGS
Josef Traben, Oberkirch, Baden, Germany, assignor to Klara Linck, trading as Gebruder Linck Maschinenfabrik und Eisengiesserei "Gatterlinck," Oberkirch, Baden, Germany
Filed Dec. 13, 1957, Ser. No. 702,708
7 Claims. (Cl. 144—326)

This invention relates to a method and apparatus for dividing wood.

In dividing wood into economically valuable products by means of sawing machines, all hitherto-known methods require an ever-increasing number of machines of different kinds, for example frame saws, circular saws, bandsaws, and an ever-increasing number of process steps, thus requiring much space, capital outlay, staff, organisation man-hours and storage capacity. Nevertheless, all such facilities have failed to prevent a relatively large amount of low-grade wood waste being produced. It has also been a great disadvantage that the smaller cut timber produced from the segments cut off round timber is less caluable than the larger boards, baulks and the like from the centre of the timber, which are the so-called main products, although the cost of producing such usable small timber from the segments is greater than for the main product. All these drawbacks apply to all sawmills and accordingly also have an unfavourable effect economically. Thus, waste from an expensive raw material, namely wood, is frequently simply burnt, because the costs of transport to a cellulose factory are not worth while.

It has now been found that the disadvantages set forth above can be obviated and at the same time a considerable number of great advantages gained in a surprisingly simple manner and with relatively small expenditure, if the wood divided by means of a sawmill installation is divided up, on passing through the installation, at least partially by means of special cutting tools, into chips which may for example be subsequently converted into chip boards.

This invention thus enables wood, especially round timber, to be converted practically completely into industrially and economically valuable products, since the chips can for example become the basic raw material for chip board production for example. A single type of machine, for example a frame saw or a circular saw, and frequently only a single machine, is often sufficient for this purpose.

Frame saws are particularly suitable because by their very nature they are extremely stable, very efficient and highly dependable in operation, have an easily inspected construction and working cycle, have a long rectilinear stroke as is required for chip producing tools and are practically always already equipped with a number of accessories such as conveyor track, controls, switchgear and the like, which can be used directly or with only slight alterations for the chip production as well. Sawing machines already in operation may be modified with small expenditure for use in practising the invention so that they can be used, not only for sawing but also for the chipping. The operator rapidly becomes accustomed to this modified operation of the machine.

With the method according to the invention and the installations for carrying out the same, it is possible to produce chips of all kinds, shapes and dimensions. The chips may for example be allowed to drop into chutes or onto conveyor bands or they may be directly removed by suction by means of exhausters, and blown into a reservoir.

Since wood in the moist state can often be worked into chips particularly well, the invention is also of great advantage in sawmills using timber fresh from the forest.

With the method according to the invention it is possible first to cut the timber into chips at only two sides situated opposite one another for example on its first pass through a saw machine installation, and thereby advantageously give these sides plane surfaces at the same time; on a second pass of the timber through the sawmill installation, these plane surfaces can serve as satisfactory working and guide surfaces, for example for top rollers and bottom rollers of a frame saw, if desired by turning the log, the remainder of which is pre-levelled, through 90° in manner known per se and conveying it in this position through the second pass. In the second pass the centre of the timber may be sawn into boards, planks and like cut timber or may be left undivided as a block, and at the same time the two remaining segments are completely cut into chips.

Moreover, the wood, for example a round timber log, may be given a single pass through the installation, during which it is converted into cut timber or undivided block timber and the rest of the wood of the log simultaneously completely divided into chips.

It is also possible to divide the entire round timber or the like completely into chips in a single passage.

The production of the chips can be effected by means of tools known for this purpose. For example all tools are suitable which have scoring knives, plane knives, tearing knives, tearing teeth, or the like. The tools, for example scoring knives and plane knives, are preferably provided on strips after the style of a saw blade for example, and fitted into the frame of a frame saw. The tools may instead however, be provided on rotating chains, such as milling chains, or on rotating discs, rollers or the like. All the tools, including the saw blades, should preferably be adjustable. For example angular adjustability of the chip-producing tools enables inter alia, the attack of the tooth teeth or the like to be adjusted to the direction of the fibres of the wood dealt with; in this way it is immediately possible to produce chips of the highest quality.

The chip-producing tools can all be provided outside the sawing machine, but in its installation, or all in or on the machine or partly outside in the installation and partly in or on the machine.

It is advisable, particularly for round timber of extraordinarily large diameters, when the tools are to be used in a frame saw, to provide the tools with their own holding and clamping frame provided, not with the conventional rigid columns of steel or the like, but by a hydraulic medium which is coupled, through hydraulic cylinders and pistons, with two holders for the tools, for example saw blades and/or chipping strips, and which hydraulic medium moves jointly with the ascending and descending tools, for which purpose the hydraulic medium passes through pipelines connecting the cylinders. By appropriate means, such as pumps and slides, the required clamping force can be exerted on the tools and be maintained. Leakage losses of the oil or the like can be compensated for example from connected storage tanks.

The following description is referred to the accompanying drawings and illustrates a number of embodiments by way of example.

In the drawings:

FIGURE 6 (sheet 3) is a side elevation of part of a chip producing tool in the form of a milling chain with holder.

FIGURE 7 is the corresponding end view of the tool shown in FIGURE 6.

FIGURE 8 is a side elevation of part of a chip producing tool with interchangeable staggered individual knives.

FIGURE 9 is the corresponding end view of the tools shown in FIGURE 8.

FIGURES 10a, b and c, are three elevations of a planing knife suitable for use in the tool shown in FIGURES 8 and 9.

FIGURES 11a, b and c are three elevations of a scoring knife suitable for use in the tool shown in FIGURES 8 and 9.

Figure 12:
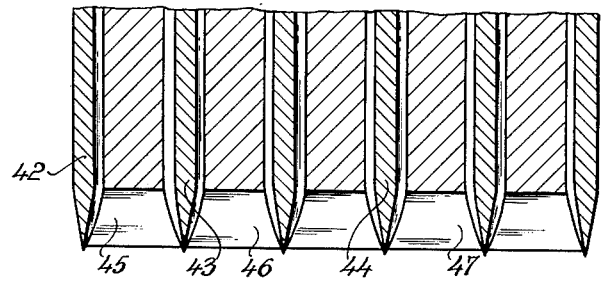
Figure 13:
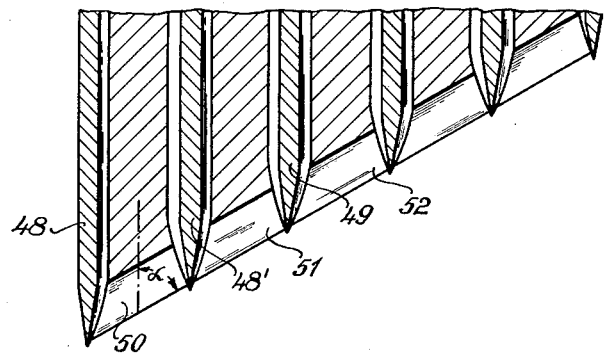

FIGURES 12 and 13 are sections of another modified embodiment of a chip producing tool comprising a set of individual scoring and planing tools.

Figure 14:
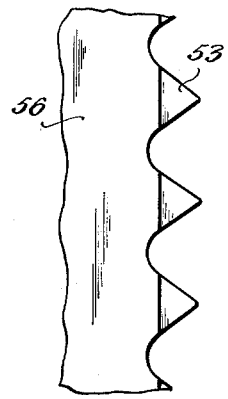

FIGURE 14 is a side elevation of scoring tools suitable for use in the tool shown in FIGURES 12 and 13.

Figure 15:
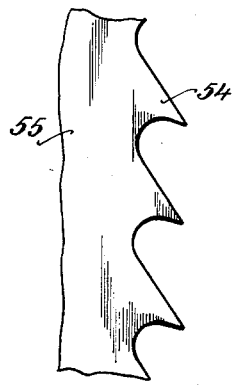

FIGURE 15 is a side elevation of planing tools suitable for use in the tool shown in FIGURES 12 and 13.

Figure 16:
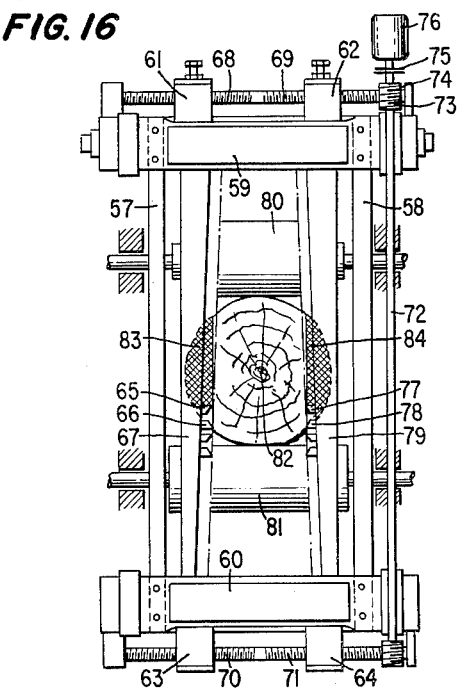

FIGURE 16 is a diagrammatic view, from the frame conveyor track, of a sawing frame constructed according to the invention with adjustable chip producing tools, during a first passage of a round timber log.

Figure 17:
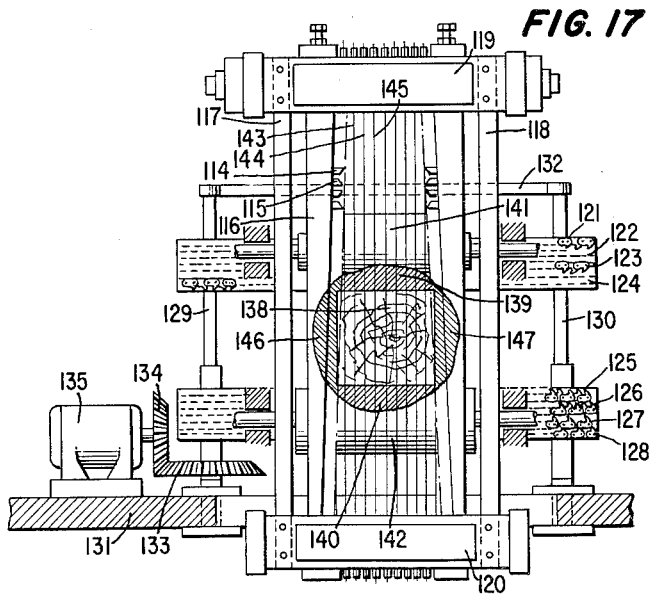

FIGURE 17 is an elevation, from the wood conveyor track of a saw frame, of an installation with horizontal chain chip producing tools in front of the frame saw and with chip producing tools and saw blades clamped rigidly in the sawing frame.

FIGURE 18 (sheet 6) is a diagrammatic elevation of a complete frame saw installation with electric remote control, rapid-clamping carriage, auxiliary carriage, cleaving wedge carriage.

FIGURE 19 is a plan view of the installation shown in FIGURE 18.

Figure 3:
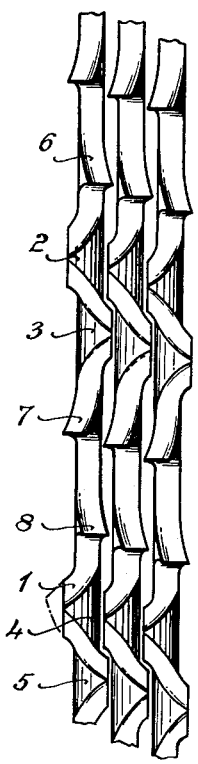
FIGURE 3 is a view from the front of a set of chip-producing tools as shown in FIGURE 2.
Figure 2:
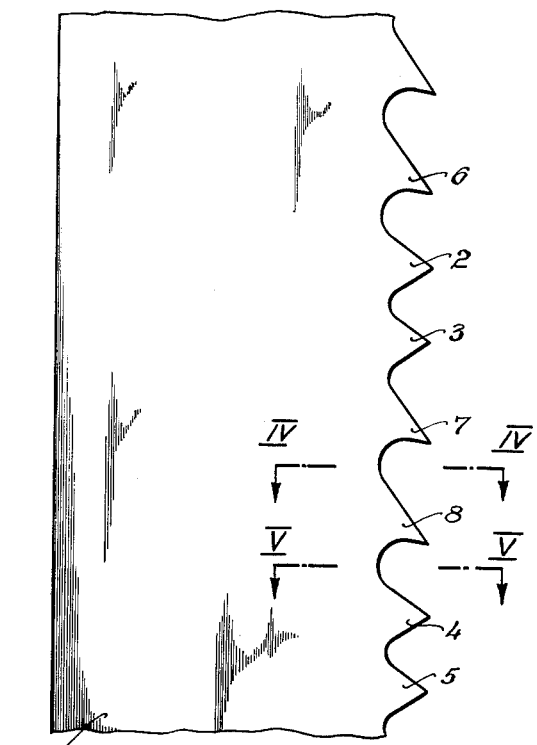
FIGURE 2 is a side elevation of part of a chip-producing tool with planing teeth and scoring teeth.
Figure 1:
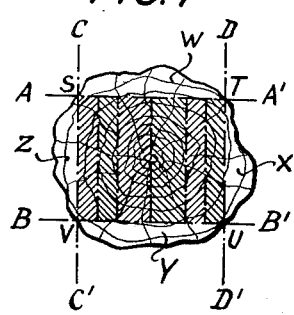
FIGURE 1 is a diagrammatic cross-section through a round timber log with the lines A—A', B—B', C—C', D—D' showing the middle STUV of the log to be divided up into boards by means of the saws, and the segments WXYZ which are to be cut into chips.
Figure 4:
FIGURE 4 is a section on the line A—B in FIGURE 2.
Figure 5:
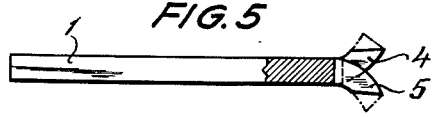
FIGURE 5 is a section on the line C—D in FIGURE 2.
Figure 1A:
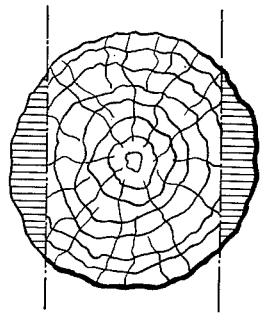
FIGURES 1A to 1F are diagrammatic illustrations showing a round timber log as operated on during practice of several respective modes of performing the method of the invention; the center of the round timber log is symbolized in the usual way, and segmental portions are marked with horizontal hatching.
Figure 1B:
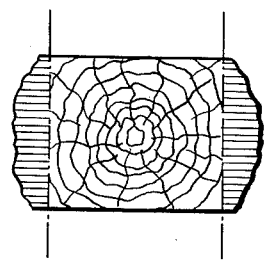
Figure 1C:
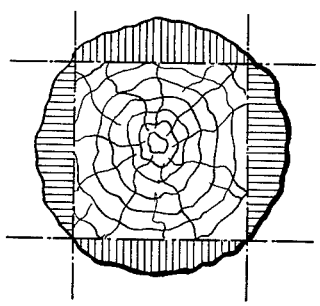
Figure 1D:
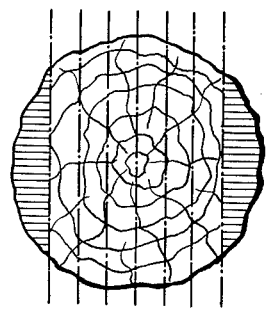
Figure 1E:
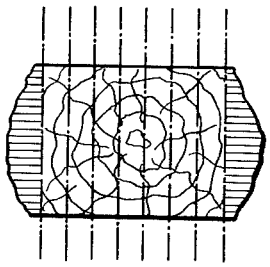
Figure 1F:
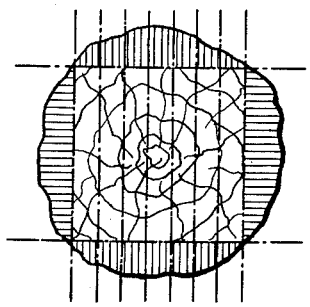

The chip-producing tool shown in FIGURES 2 to 5 has the basic form of a saw blade for mounting in the sawing frame of a frame saw and is provided with triangular or mousetooth-shaped scoring teeth, as at 2, 3, 4 and 5 and with planing teeth having the approximate shape of a wolf's tooth, as at 6, 7 and 8. A pair of scoring teeth and a pair of planing teeth are arranged alternately, the members of each pair being set one to one side and the other to the other side. As is well known, scoring teeth scratch into the wood, while planing teeth dig out of the wood a chip situated between the scratches. The scoring teeth are set by bending out, and then grinding away the tip which is shown in chain line in FIGURE 5. FIGURE 3 shows a set of three chip-producing tools according to FIGURES 2, 4 and 5. The planing teeth can also be formed by swaging instead of by setting.

In a chip-producing tool constructed in the manner of a milling chain as shown in FIGURES 6 and 7, a milling chain consists of individual chains as at 10, 11, 12 disposed directly side by side, and composed of links as shown at 13, 14, 15. The chain runs on a holder 9. The links are constructed as flat links and are connected to one another through joints as shown at 16 and 17. The chain has scoring teeth 18, and planing teeth 19.

FIGURES 8, 9, 10a, b, and c and 11a, b, and c show a chip-producing tool with planing knives and scoring knives inserted in a holder 20, their mode of operation being the same, for example, as that of the chip-producing tool shown in FIGURES 2, 3, 4 and 5. The planing knives, some of which are designated 21, 22, 23, 24, 25, 26 and the scoring knives, some of which are designated 27, 28, 29, 30, are inserted in the holder 20 so as to be interchangeable; thus planing knife 21, has a shoulder 31 lying against the holder, and a shank 32 by which it is inserted into the holder. The other end of the shank 32 comprises a threaded part 33, on to which a clamping nut 34 is screwed. The head of the knife 21 tapers from a cutting edge 35 rearwardly to the shoulder 31. Scoring knife (to which the other scoring knives 28, 29, 30 etc. are similar) has a head constructed as a fork with two scoring cutting edges 36, 37, a shoulder 38 which lies against the holder 20, and a shank 39 which is inserted into the holder. The shank 39 has a threaded portion 40 by which it is secured in the holder by a clamping nut 41.

In the chip-producing tools shown in FIGURES 12 to 15, planing knives and scoring knives, disposed horizontally when viewed in cross-section, are combined side by side to form a group. In the embodiment shown in FIGURE 12, all the cutting edges lie in a plane at right angles to the longitudinal axes of the knives; in this case the scoring knives 42, 43, 44 project by an amount approximately corresponding to the thickness of the wood chip to be produced. The scoring knives 42, 43, 44 are arranged alternately with the planing knives 45, 46, 47. In the embodiment shown in FIGURE 13, the edges are inclined to the longitudinal axes, and here too the scoring knives 48, 48', 49 project approximately by an amount corresponding to the chip thickness. The scoring knives are again arranged alternately with the planing knives 50, 51, 52. The scoring knives, for example knife 53, have a similar triangular or mouse-tooth shape to that shown in FIGURES 2 to 5, while the planing knives, for example 54, have the form of the wolf's tooth also shown in FIGURES 2 to 5. The planing knives and scoring knives shown in FIGURES 12 and 13 being combined to form a group, attack the front end of the round timber log, namely either at right-angles to the longitudinal axis of the log (FIGURE 12) or at an angle α to said longitudinal axis (FIGURE 13), the said angle being selected according to requirements. FIGURES 14 and 15 show tools 55 and 56 having respectively planing knives 54, and scoring knives 53, which tools may be clamped into the saw frame of the frame saw in the same way as the saw blades.

The saw frame according to FIGURE 16 has as is usual, two column 57, 58 and two traverses 59, 60. Four slides are longitudinally slidable on the traverses, namely slides 61, 62 on the top traverse and slides 63, 64 on the bottom traverse. The slides 61 and 63 and the slides 62 and 64 hold between them in each case the saw blades, or one of the chip-producing tools carrying the scoring knives and planing knives, for example 65, 66, 67. The slides are movable by threaded spindles 68, 69, 70 and 71; spindles 68 and 70 have threads of one hand, while spindles 69 and 71 have threads of the opposite hand. The spindles 68, 69 are joined together and are collinear as are the spindles 70, 71. These two co-axial groups of spindles are rotatable by a shaft 72 through a worm gear in each case, comprising, for shafts 68 and 69, a worm 73, and a worm wheel 74 situated behind it. The shaft 72 is mounted in the two traverses 59 and 60 of the sawing frame. The top end of the shaft 72 is coupled by means of a coupling 75 to an electric driving motor 76, which obtains its current through flexible cables (not shown). By means of this motor 76, the spindles 68, 69, 70, 71 may be set in rotation through the respective worm gears, for example by control means located in the control station of the frame saw or on the rapid-clamping carriage of the saw machine, whereby the slides 61, 62, 63, 64 running on said spindles are slid according to the direction of the thread of the spindles so that as shown in FIGURES 16 and 17 the chip-producing tools 65, 66, 67 forming one group are moved towards or away from the tools 77, 78, 79 constituting another group. Depending upon this adjustment of the tools, a greater or lesser amount is chipped away from the segments 83, 84 of the log 82 running between the rollers 80, 81.

For the first pass of the log through the machine the conventional saw blades are dismounted from the frame of the frame saw as shown in FIGURE 16. The chip-producing tools then chip the left-hand and right-hand segments of the log by vertical reciprocation of the saw frame in the usual manner so that the two flat facing and parallel surfaces are simultaneously produced on the log. For the second pass of the log through the machine the saw blades are replaced in the frame of the frame saw, the remainder of the log is turned through 90°, and is passed through between the top and bottom rollers of preferably the same frame saw. The saw blades then produce level-faced boards of the desired thickness at right-angles all round, while the chip-producing tools chip the two remaining segments of the log.

FIGURE 17 shows an embodiment in which, in addition to chip-producing tools, 114, 115, 116, clamped in a sawing frame comprising columns 117, 118 and traverses 119, 120, further chip-producing tools are provided, namely in front of the frame saw. These additional chip-producing tools consist essentially of horizontally rotating top chains 121, 122, 123, 124 equipped with scoring teeth and planing teeth and like bottom chains 125, 126, 127, 128. The chains may be constructed as shown in FIGURES 6 and 7. The chains 121–124 form a chain group, as do the chains 125–128. The two chain groups have a common vertical bearing and driving shafts 129 and 130, which are mounted in a base plate 131 of the frame saw installation and are held at the top by a bearing yoke 132. The shaft 129 is rotated through bevel gears 133 and 134 by an electric motor 135 also disposed on the base plate, and thereby rotates a driven chain wheel on the shaft 129, and hence the chain 121 which runs over the chain wheel and over an idler chain wheel disposed on shaft 130.

When a log 138 passes through the installation, its top and bottom segments 139 and 140 are first converted into chips by the chain groups 121–124 and 125–128, respectively. Immediately thereafter the thus pre-machined log, which has at the same time been levelled top and bottom, passes into the region of rollers 141, 142 and of the sawing frame constituted by parts 117, 118, 119, 120, which is equipped with the chip-producing tools 114, 115, 116 and saw blades 143, 144, 145. The saw blades convert the middle of the wood into right-angled boards having level surfaces on four sides, while the chip-producing tools convert the remaining two segments 146, 147 into chips. The rollers 141 are mounted adjustably in the frame of the frame saw in the usual way. The chip-producing chains 121–124 are adjustable vertically, for example to enable the wood to be converted into chips to a greater or lesser extent as desired.

The embodiment according to FIGURE 17 also has the special advantage that the round timber is passed through the frame saw and can be converted to the desired intermediate product, such as boards, planks, baulks, laths, chips in any desired size and quantity in a single working step.

The saw frame 215 shown in FIGURES 29 and 30 rests on a pedestal 216 and is equipped in the usual manner with, inter alia, a main shaft 217, a flywheel 218, a top front feed roller 219, a top rear feed roller 220, a bottom front feed roller 221 and a bottom rear feed roller 222. The sawing frame 223 is equipped with saw blades 224 and chip-producing tools, the latter not being given a reference. Said tools hang from adjusting slides, for example 225, 226, which are slidable by means of the screwthreads 227, 228, provided on a common spindle. The threads run in opposed directions so that on rotation of the spindle the slides 225 and 226 either move towards or away from one another. The sawing frame, which runs in guides 229, 230 of the frame body, also carries an electric motor 231 which, as in the embodiment shown in FIGURE 16, rotates the threaded members 227, 228 and thereby adjusts the chipping tools by way of the adjusting slides 225 and 226. The saw blades are also adjustable in the same type of construction.

A carriage 232 is provided at the outlet side of the saw frame and carries cleaving wedges, for example 236. The carriage is mounted on wheels 233, 234, running on the rails 235. The cleaving wedges convey the boards coming out of the saw frame further in known manner.

An auxiliary carriage 237 is provided at the inlet side in front of the saw frame, mounted on wheels 238, 239 running on a track 240, to support a log. The log is also supported in a spar 243 of the rapid-clamp carriage 242, which at the same time holds the timber laterally by means of clamping jaws, as at 244; at their ends the jams 244 have jaw crowns 245, which grip into the wood by means of teeth. The clamping jaw 244 is mounted on a head 246, which in turn rests on a bracket 247 of the clamping carriage 242 and is equipped with an operating handwheel 248. The operator sits on a seat 249 at the rear end of the carriage 242 and can also observe a synchronising device 250, which indicates to him the position assumed by the chipping tools, the saw blades and the cleaving wedges at the same time, so that he can for example remotely adjust the saw blades and the cleaving wedges associated therewith, according to the indications of the synchronising device.

A cable 251 coming from an electric power source such as electric mains leads directly to a motor relay 252, to which is connected a cable 253 looped over a series of rollers as at 254, 255 on a fixed track 256. The rollers 254, 255 etc. are adapted to be drawn apart in the direction of the timber conveyor track of the saw frame. The cable 253 leads to the synchronising device 250. The motor 231 mounted on the sawing frame 223 is also connected to the relay 252 through a cable 257, a coupling plug 258, and a flexible cable 259, said motor adjusting the saw blades and the chip-producing tools. The motor rotates the shaft 60 (FIGURE 29) on which are disposed worms 261, 262, which act on the adjusting spindles through worm wheels 263 and 264 respectively. A lead 265 is also connected to the relay 252 and leads to the driving motor 266 for the adjustment of the cleaving wedge carriage and of the cleaving wedges themselves. The electrical installation is advantageously so arranged that it can also be operated from a conventional control station on the saw frame.

While certain embodiments have been described, the invention is not limited thereto, but may be modified in manners apparent to those skilled in the art within the scope and spirit of the invention.

I claim:
1. In a method of dividing wood, the steps of subjecting a round timber to a first lengthwise path through a saw machine installation, reducing a pair of opposed segmental portions only of said timber to smooth long-grain chips during said pass to form a pair of opposed flat plane surfaces on the timber, rotating the resulting timber having said two opposed plane surfaces through 90° about its longitudinal axis, subjecting said timber after rotation to a second lengthwise pass through said installation, reducing to smooth long grain wood chips during said second pass a further pair of segmental portions of said timber to produce another pair of opposed plane surfaces on said timber at right angles to the first mentioned pair of opposed plane surfaces and simultaneously with the reduction of said second pair of segmental portions to wood chips during said second pass sawing the middle portion of the timber defined by the chords of said segmental portion lengthwise into planks.

2. An installation for subdividing timber into wood chips and planks comprising a frame saw machine and means for passing timber lengthwise through said machine, said machine including a saw frame, means for reciprocating said saw frame transversely to the passage of said timber through said machine, a plurality of saw blades, a group of chip-producing tools, means mounting said saw blades and said group of chip-producing tools on said saw frame, so that on reciprocation of said saw frame said group of chip-producing tools reduces at least one segmental portion of timber passing through the machine to wood chips and said saw blades saw the timber not acted on by said chip-producing tools into planks.

3. An installation as defined in claim 2 including another group of chip-producing tools in front of said saw frame and disposed to act on segmental portions of said log transverse to the direction of reciprocation of said saw frame.

4. An installation for subdividing timber as defined in claim 2 wherein said means for mounting said saw blades and said chip-producing tools on said saw frame further includes means for adjusting the positions of the chip-producing tools and saw blades relative to each other and to the end of a log reduced by the machine.

5. An installation for subdividing timber comprising a frame saw machine and means for passing timber lengthwise through said machine, said machine including a saw frame, means for reciprocating said saw frame transversely to the passage of said timber, a plurality of saw blades, two sets of chip-producing tools, means for adjustably mounting one of said sets of chip-producing tools on one side of said saw frame and the other of said sets of chip-producing tools on the other side of said saw frame, and said plurality of saw blades between said two sets of chip-producing tools so that said tools and said saw blades are adjustable in a direction transverse to the direction of passage of a log through the installation and relative to each other, so that said chip-producing tools reduce two opposed segmental portions of the timber to wood chips and said saw blades reduce the center of said timber into a plurality of planks.

6. An installation as defined in claim 5 wherein said adjustable mounting means for the saw blades and the chip-producing tools comprises threaded slides at the top and bottom of the saw frame, threaded spindles at the top and bottom of the saw frame threadably engaged with the slides at the top and bottom of said frame and an electric motor drivingly coupled to said spindles so that when said electric motor is driven in one direction the slides carrying the saw blades and chip-producing tools are moved away from each other to increase the spacing between the saw blades and the chip-producing tools and when the electric motor is driven in an opposite direction, the saw blades and chip-producing tools are moved toward each other.

7. An installation as defined in claim 6 wherein said chip-producing tools comprise a plurality of individual chip producing elements combined to form a set of chip-producing tools, each chip-producing element being adjustably mounted in said slide.

References Cited in the file of this patent

UNITED STATES PATENTS

| | | |
|---|---|---|
| 201,938 | Nickerson | Apr. 2, 1878 |
| 426,217 | Russell | Apr. 22, 1890 |
| 526,043 | Merrill | Sept. 18, 1894 |
| 819,491 | Wright | May 1, 1906 |
| 1,020,100 | Keogh | Mar. 12, 1912 |
| 1,075,907 | Dunton | Oct. 14, 1913 |
| 1,461,090 | Hansen | July 10, 1923 |
| 1,485,527 | Raeber | Mar. 4, 1924 |
| 1,747,123 | Morris | Feb. 11, 1930 |
| 1,842,419 | Morris | Jan. 26, 1932 |
| 1,985,479 | Brown | Dec. 25, 1934 |
| 2,517,374 | Amon | Aug. 1, 1950 |
| 2,723,689 | Winquist | Nov. 15, 1955 |
| 2,819,743 | Birkel et al. | Jan. 14, 1958 |
| 2,889,859 | Johnson | June 9, 1959 |

FOREIGN PATENTS

| | | |
|---|---|---|
| 692,752 | France | Aug. 5, 1930 |
| 52,757 | Norway | July 3, 1933 |
| 519,846 | Germany | Mar. 5, 1931 |